Oct. 23, 1956 L. C. SIMMONS 2,767,690

AIR STARTING MEANS FOR STEAM HEATING BOILER CONTROL SYSTEMS

Filed Sept. 13, 1950 5 Sheets-Sheet 1

Inventor:
Lawrence C. Simmons,
By C. C. Hines,
Atty.

AIR STARTING MEANS FOR STEAM HEATING BOILER CONTROL SYSTEMS

Filed Sept. 13, 1950

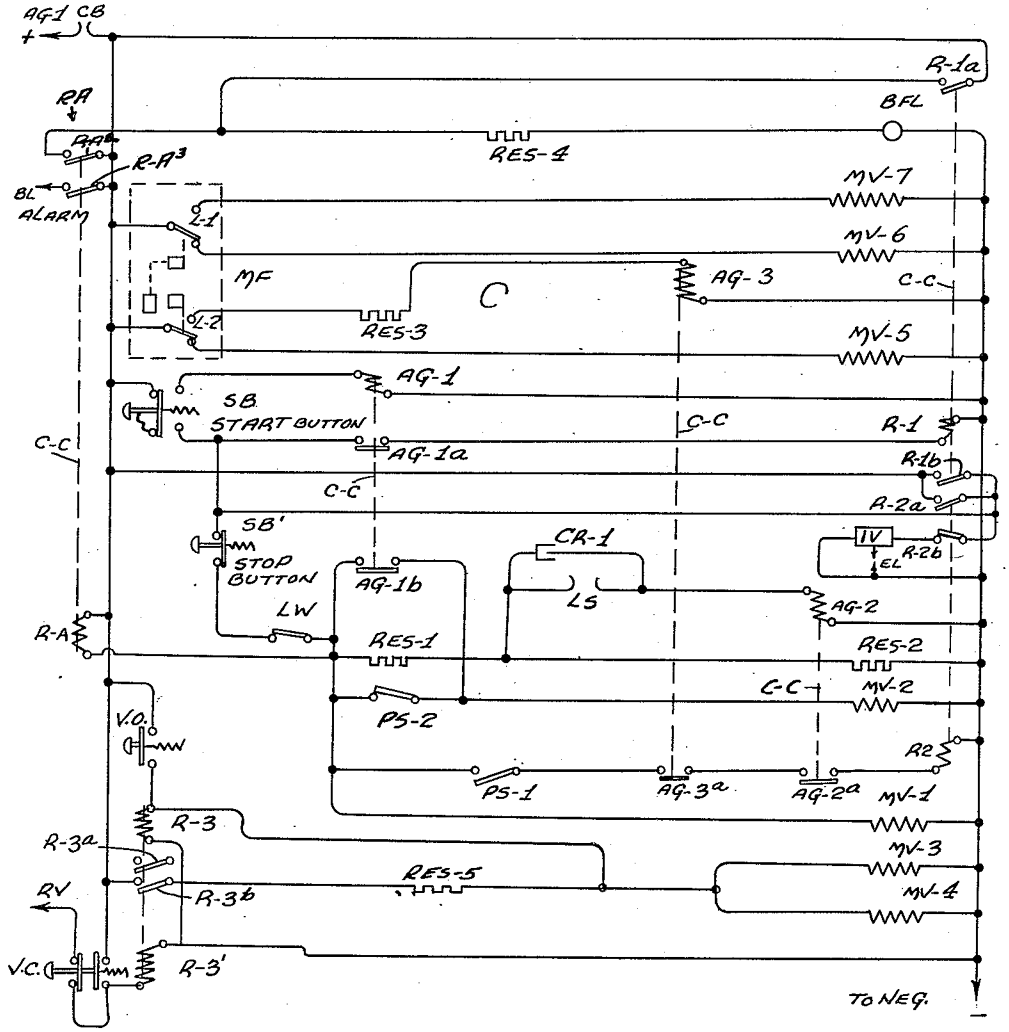

| | | | | | |
|---|---|---|---|---|---|
| CB | CIRCUIT BRK'R | RES 5 | 60 OHM RESISTOR | PS-1 | BURNER PRESS SW. |
| SB | START BUTTON | LS | FLAME CONTROL SW. | PS-2 | TURBINE AIR DRIVE P.S. |
| SB' | STOP | MF | MAGNATROL FLOAT | V.O. | TRAINLINE VALVE OPEN BUTTON |
| R-1 | START RELAY | CR-1 | "L.S." CONDENSER 0.05 MFD. | V.C. | " " " CLOSED " |
| R-2 | RUNNING " | MV-1 | FUEL MAGNET VALVE | L-1 | WATER SWITCH UPPER LIMIT |
| R-3 | TRAIN LINE " | MV-2 | TURBINE AIR DRIVE MAG. VAL. | L-2 | " " LOWER " |
| R-A | ALARM " | MV-3 | TRAINLINE " " | BFL | BOILER FAILURE LIGHT |
| EL | IGNITION ELECTRODE | MV-4 | BLOW DOWN " " | | |
| IV | " SET | MV-5 | PUMP ON " " | | |
| LW | LOW WATER SWITCH | MV-6 | " CONTROL | | |
| RES-1 | 50 OHM RESISTOR | MV-7 | " OFF | | |
| RES-2 | 25 " " | AG-1 | START CONTROL AGASTAT 30 SEC. | | |
| RES-3 | 25 " " | AG-2 | FLAME " " 15 " | | |
| RES-4 | 25 " " | AG-3 | MAGNATROL CONTROL AGASTAT 5 MINUTES | | |

C-C COUPLING CONNECTIONS BETWEEN COILS & SWITCHES

FIG. 2

INVENTOR
LAWRENCE C. SIMMONS
BY C. C. Hines
ATTORNEY

Oct. 23, 1956 L. C. SIMMONS 2,767,690

AIR STARTING MEANS FOR STEAM HEATING BOILER CONTROL SYSTEMS

Filed Sept. 13, 1950 5 Sheets-Sheet 3

INVENTOR:
Lawrence C. Simmons,
By [signature]
ATTORNEY.

Oct. 23, 1956 L. C. SIMMONS 2,767,690

AIR STARTING MEANS FOR STEAM HEATING BOILER CONTROL SYSTEMS

Filed Sept. 13, 1950 5 Sheets-Sheet 4

INVENTOR:
Lawrence C. Simmons,

BY

C. C. Hines,
ATTORNEY.

Oct. 23, 1956 L. C. SIMMONS 2,767,690

AIR STARTING MEANS FOR STEAM HEATING BOILER CONTROL SYSTEMS

Filed Sept. 13, 1950 5 Sheets-Sheet 5

INVENTOR:

LAWRENCE C. SIMMONS,

BY C. C. Hines,

ATTORNEY.

United States Patent Office 2,767,690

Patented Oct. 23, 1956

1

2,767,690

AIR STARTING MEANS FOR STEAM HEATING BOILER CONTROL SYSTEMS

Lawrence C. Simmons, Ossining, N. Y., assignor to The New York Central Railroad Company, New York, N. Y., a corporation of New York Application September 13, 1950, Serial No. 184,669

19 Claims. (Cl. 122—448)

This invention relates to improvements in steam heating boiler control systems, and particularly to means for starting the system into action and controlling and regulating the operation of a fuel supply pump and the supplies of fuel, such as a liquid hydrocarbon fuel, and a gaseous fuel atomizing or conditioning medium, such as air or steam, or both, to the burner of a boiler heater or steam generator of a steam heating or supply system, as well as to supply combustion air to the combustion chamber or fire-box of the boiler if desired. More particularly the invention relates to a steam generator and starting, controlling and regulating means therefor designed for installation on an electric or diesel locomotive or on a baggage or other car for cooperation with steam heating apparatus of standard cars or coaches to supply steam for heating the same. The invention is especially adapted for use on electric locomotives for supplying steam to the cars of a train being hauled by an electric or diesel locomotive substituted for a steam locomotive. The invention is, however, capable of use on other vehicles or in stationary plants where the steam is utilized for either heating or power purposes.

The present invention is designed as an improvement upon the control system covered by my prior pending application Serial No. 776,304, filed September 26, 1947, which has eventuated in Patent No. 2,566,041, dated August 28, 1951, wherein a blower-motor-turbine-oil pump set is employed to supply fuel and atomizing air or steam, or both at times, to an atomizing burner, preferably one of whirl type, and also to supply combustion air to the combustion chamber or fire-box of the boiler. This blower-motor-turbine-oil-pump set, in the form shown in said Patent No. 2,566,041, comprises a gear-type fuel pump, a steam turbine, a paddle-type blower and an electric motor mounted on a common shaft to operate in unison for calibrated fuel and combustion air supplying actions, the set being initially driven by the electric motor to supply fuel and combustion air to start the burner into operation, then operated by the motor and turbine jointly to increase the power and speed of the set when the boiler begins to generate and steam at low pressure is supplied to the turbine to supplement the driving action of the electric motor, and finally operated by the turbine alone under steam supplied thereto at relatively high pressure when the boiler is fully generating. These operations of the blower-motor-turbine-oil-pump set are governed by electrical and pressure regulated controlling means whereby the electric current to the motor is cut off when the boiler pressure reaches a predetermined degree, after which the supply of steam to the turbine to drive the set is regulated and controlled as a function of boiler pressure. While the blower-motor-turbine-oil-pump set is being operated to start the burner, compressed air from a suitable source, such as the main air reservoir of the locomotive, is also supplied directly to the burner for use as an atomizing agent to preliminarily atomize the fuel until steam generation begins. When the boiler begins to generate steam at low pressure, steam is also supplied for admixture with the compressed air passing to the burner to serve as the atomizing agent. As soon, however, as the boiler begins to generate steam at a high pressure, the control means operates to automatically cut off the supply of atomizing air to the burner and thereafter, as long as the boiler continues in normal operation, steam alone is supplied to the burner as the fuel atomizing agent.

2

The main object of the present invention is to provide means whereby the use of an electric motor as a component part of the blower-motor-turbine-oil-pump set for initially driving the set is rendered unnecessary and whereby such element may be eliminated and compressed air supplied to the turbine to initially drive the set, thus reducing the number of working parts of the set and simplifying its construction and that of the controlling and regulating means of the system, with a saving of cost with regard to construction, installation, operation and maintenance of the system.

A further object of the invention is to provide a novel construction and arrangement of controlling and regulating means for governing the operation of this new air-start system.

A still further object of the invention is to provide novel means for controlling the feed of water to the boiler.

In a copending application, Serial No. 294,679, filed June 20, 1952, which is a continuation-in-part of the present application, I have claimed the novel means disclosed for controlling the operation of the turbine and water feed regulators to coordinately govern the boiler firing rate and the level of the water in the boiler.

In the accompanying drawings illustrating the invention,

Fig. 2 is a diagrammatic view of the wiring of the control circuits thereof.

Figure 1:
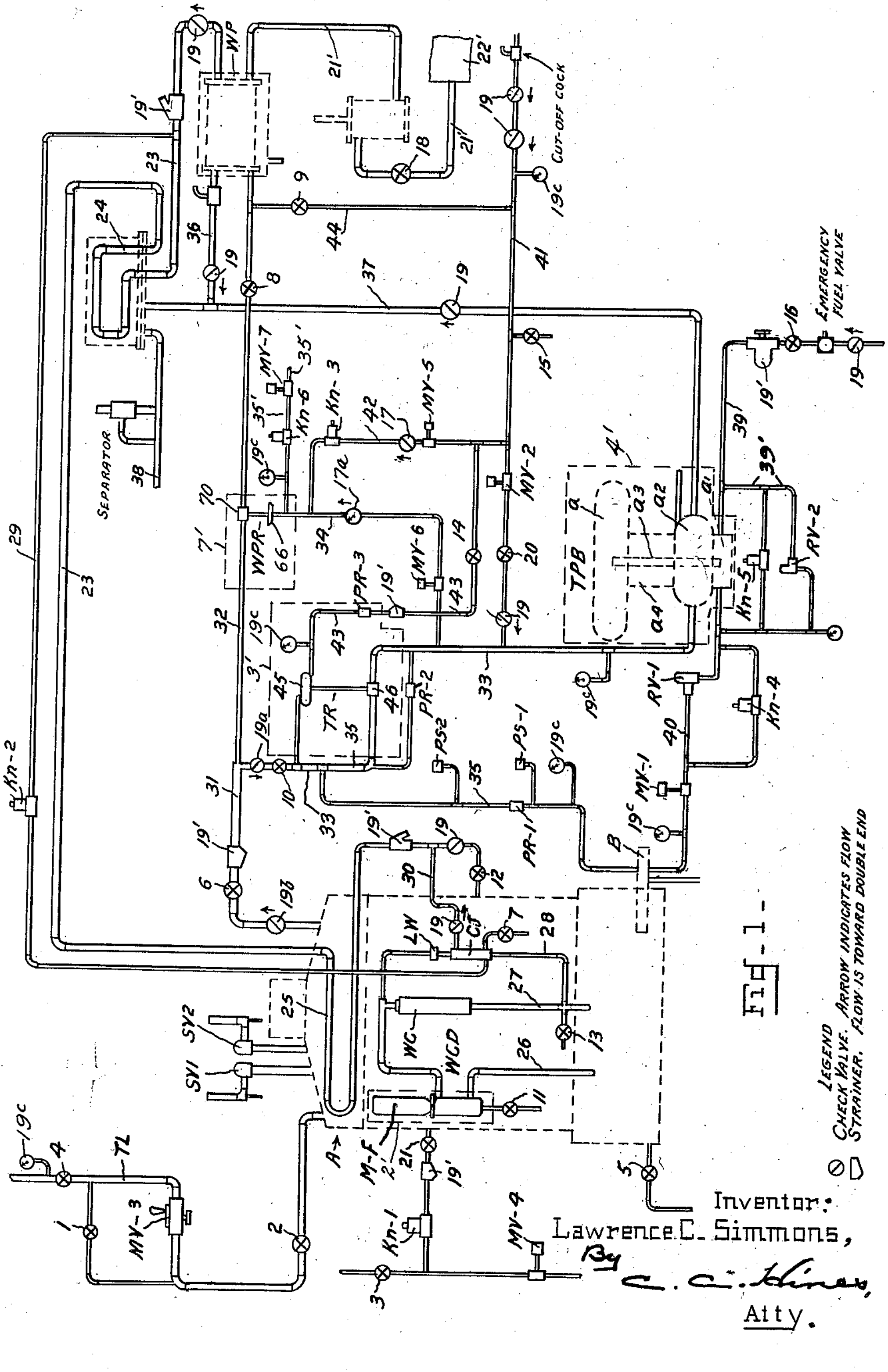
Fig. 1 is a diagrammatic view of a heating system embodying the novel features of my invention.

The following table of legends applying particularly to the system shown in Fig. 1 is here given as a ready reference aid to facilitate reading of the system to obtain an understanding of the construction and operation of the component parts thereof:

*Legends*

X Manual valves, even numbers normally open in operation, odd numbers normally closed:

| | |
|---|---|
| 2 | Train line |
| 4 | Train line |
| 6 | Auxiliary steam |
| 8 | Pump steam |
| 10 | Turbine steam |
| 12 | Boiler feed |
| 14 | Air to turbine reg. valve |
| 16 | Fuel |
| 18 | Water |
| 20 | Turbine air |
| 22 | Cont. blowdown |
| 1 | Train line emergency |
| 3 | Continuous blowdown, test |
| 5 | Boiler blowdown |
| 7 | Drain and water sample |
| 9 | Pump air |
| 11 | MF blowoff |
| 13 | WC blowoff |
| 15 | Stack blower |

MV Magnet valves:
- MV–1 Fuel
- MV–2 Turbine air drive
- MV–3 Train line, may be operated manually
- MV–4 Continuous blowdown
- MV–5 Pump on governed by MF
- MV–6 Pump, load control governed by MF
- MV–7 Pump off governed by MF K$n$ Key needle valves:
- K$n$–1 Continuous blowdown. Set for 100 lbs. per hour
- K$n$–2 Set to keep CJ cool
- K$n$–3 Set for 40 lbs., when X10 is closed and MV–5 open
- K$n$–4 Low fire, set for minimum fire
- K$n$–5 High fire, set for maximum fire
- K$n$–6 Open 1 turn SV or RV Relief or safety valves:
- SV–1 Set for 250 lbs.
- SV–2 Set for 252 lbs.
- RV–1 Fuel control, set for 40 lbs.
- RV–2 Pump protection 250 lbs.

PS Pressure switches:
- PS–1 Set to close at 10 lbs. and reopen at 5 lbs.
- PS–2 Set to open at 60 lbs. and reclose at 42 lbs.

Figure 4:
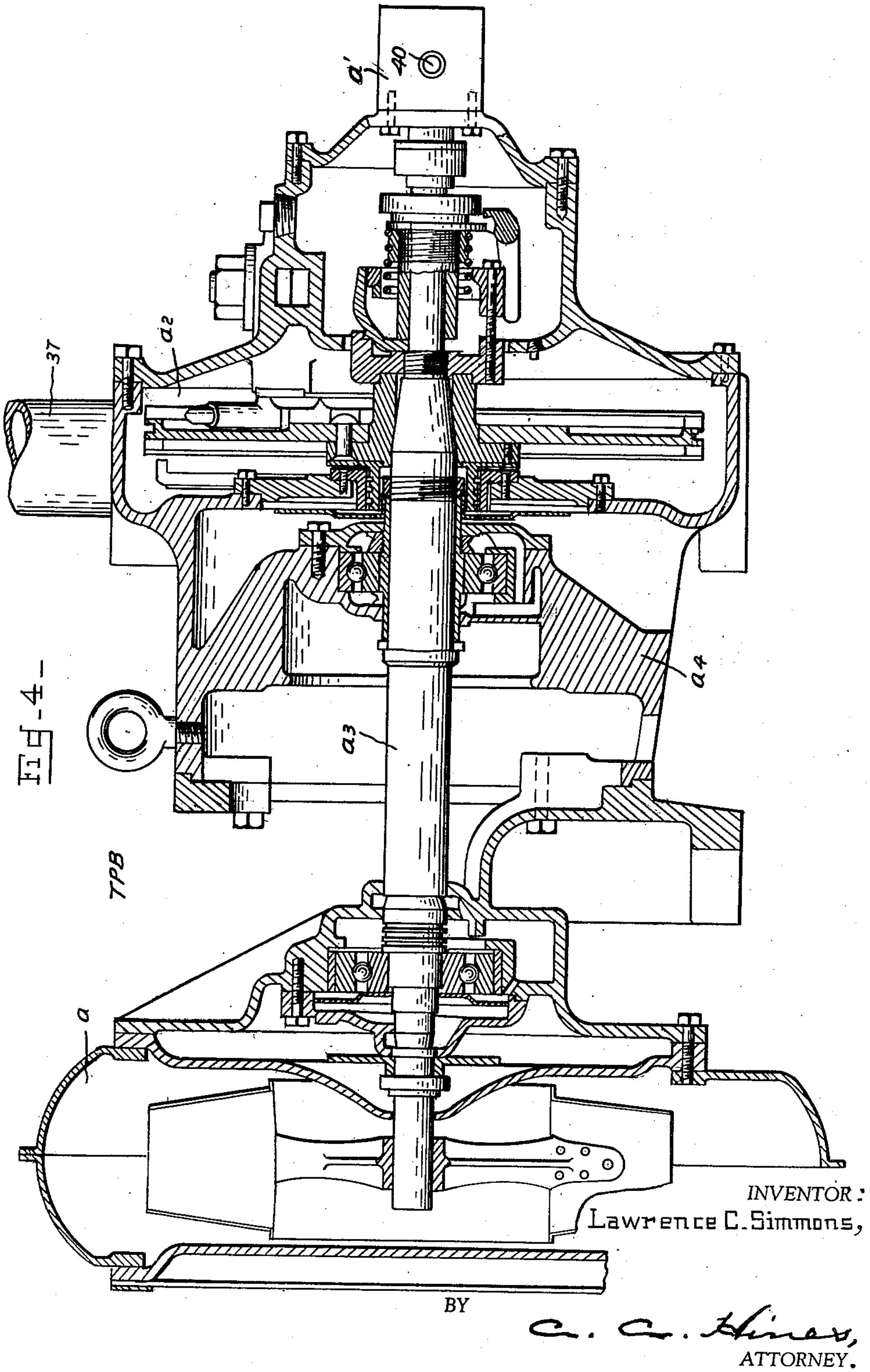
Fig. 4 is a longitudinal section on an enlarged scale through the turbo-fuel-pump-blower unit.

Pressure regulating valves:
- 1 Atomizer, set for 15 lbs.
- 2 Turbine standby, set for 15 lbs.
- 3 Turbine reg. control, set for desired train l. press.
- MF Magnatrol float, boiler water control
- CJ Cooling jacket, for LW switch
- LW Low water thermostat
- WC Water column Referring now particularly to the organization shown in Fig. 1, the steam heating supply system comprises a boiler or steam generator A of the type described, an atomizing burner B, preferably of whirl type, a steam driven water pump WP for supplying water to the boiler, and a fuel-pump-blower unit TPB indicated at 4' in Fig. 1 and shown in detail in Fig. 4, said unit consisting of a blower *a* for supplying combustion air to the boiler fire-box, a gear-type pump *a'* for supplying a liquid fuel, such as oil, to the burner, and a turbine $a^2$ for driving the blower and fuel pump, said blower, fuel pump and turbine being mounted on a common shaft $a^3$ within a common casing $a^4$; together with a superheated steam service pipe TL for supplying steam to the car heaters, a system of piping connecting the burner, water pump, turbine and fuel pump with the boiler and a source of compressed air supply, a set of devices, generally indicated at WCD, for regulating the water level in the boiler, and an electric circuit C containing control devices associated with automatic control elements in the piping of the system and governing or governed by the automatic control elements in the circuit to regulate the supply of water to the boiler, fuel to the burner, driving air and steam to the turbo-fuel-pump-blower unit, and atomizing atmosphere air and atomizing steam from the boiler to the burner.

Figure 6:
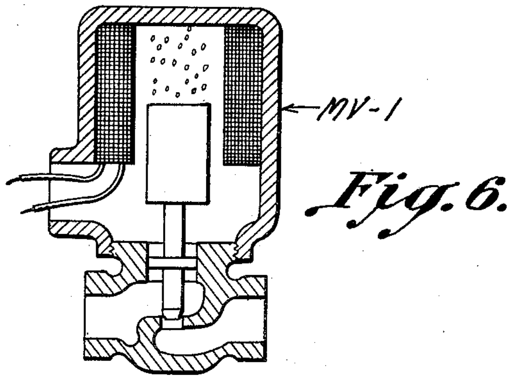
Fig. 6 is a similar view of one of the magnet valves.

The boiler is provided with two safety valves, one, SV1, set for 250 lbs. pressure, and the other, SV2, set for 252 lbs. pressure, while in the various pipe connections of the system, which are hereinafter more fully described, are arranged a turbine regulator TR and sets of valves and pressure switches for governing the flow of the fluids to the working parts. These sets of valves and switches consist of a set of manual valves 1 to 16, inclusive, and 18, 19, 20, 21 and 22, the even-numbered valves being normally open and the odd-numbered valves normally closed in operation, a set of magnet valves MV–1 to MV–7, inclusive, one of which is shown in detail in Fig. 6, a set of key-needle valves K$n$–1 to K$n$–6, inclusive, a pair of relief valves RV–1, RV–2, a set of pressure regulating valves PR1, PR2, PR3, and a pair of pressure switches PS1, PS2. In addition to these valves and switches, there are arranged at proper points in the piping the check valves 17, 17$^a$, 19$^a$, 19$^b$ gauges 19$^c$ and strainers 19', the direction of flow through the check valves being indicated by the associated arrows and the direction of flow through the strainers being toward their wider ends. Of these valves of set 1 to 16, 20, 21, 22 whose functions are not indicated by legends on or applying to Fig. 1 of the drawings or hereinafter described, valve 1 is an emergency valve which may be opened to allow steam to by-pass valve MV–3 when occasion requires, valve 3 is a continuous blow-down test valve, valve 5 a boiler blow-down valve, and K$n$–1 is a continuous blow-down key-needle valve set for 100 lbs. per hour. Valve MV–3 is a magnet valve which may be operated by hand when required. Pressure switch PS1 is set to close at 10 lbs. and reopen at 5 lbs. Pressure switch PS2 is set to open at 60 lbs. and reclose at 42 lbs. Pressure regulating valve PR1 is set for 15 lbs., while pressure regulating valve PR2 is set for a turbine standby action at 15 lbs., and pressure regulating control valve PR–3 is set for a desired train line pressure.

Of the remaining valves of set 1–16 and 19, valves 19 may be control or check valves of conventional type, but valves 17, 17$^a$, 19$^a$, 19$^b$ are arranged and designed to perform special functions, as hereinafter described.

Referring now to the circuit C shown in Fig. 2, which is supplied with current from a battery or other source on the vehicle, this circuit includes the circuit breaker CB, the start button SB, the stop button SB', the start relay coil R–1 and its switch R–1$^a$, the running relay coil R–2 and its switches R–2$^a$, R–2$^b$, the train line relay coil R–3 and its switches R–3$^a$, R–3$^b$, R–3', the burner and burner light failure alarm set B–1 and R–A' comprising the alarm relay coil R–A and switches R–A$^a$, R–A$^b$, the start control Agastat coil (30 sec.) AG–1 and switches AG–1$^a$, AG–1$^b$, the flame control Agastat coil (15 sec.) AG–2 and its switch AG–2$^a$, the magnatrol control Agastat coil (5 mins.) AG–3 and switch AG–3$^a$, the ignition electrode EL, the ignition set IV, the low water switch LW, the fuel magnet valve MV–1, the turbine air drive magnet valve MV–2, the train line magnet valve MV–3, the blow-down magnet valve MV–4, the pump-on magnet valve MV–5, the pump control magnet valve MV–6, the pump-off magnet valve MV–7, the flame control switch LS, the burner pressure switch PS–1, the turbine air drive pressure switch PS–2, the boiler failure light BFL, the magnatrol float MF, the train line valve VO (open), the train line valve VC (closed), the upper limit water level switch L–1, the lower limit water level switch L–2, and the resistors RES–1 to RES–5, inclusive, of suitable values, which parts are connected to operate in the manner hereinafter described to govern the actions of the water pump, turbo-pump unit and other working parts of the system.

The broken lines *c—c* denote the coupling connections between each relay coil and its associated switch or switches.

The water supplying connections to the pump WP and boiler consist of a supply pipe 21' leading to the pump from a tank 22' or other source of supply and a feed pipe 23 leading therefrom to a condenser 24 and an economizer 25 and thence to the water containing space of the boiler. The supply of water to the boiler is controlled in this system by regulating the supply of steam to the pump WP and the water level in the boiler is limited within certain levels by the action of the set of control devices WCD in combination with a pressure regulator WPR which govern the supply of steam to the water pump and also operate to cut off the supply of steam to the pump and give an alarm in the event that the water in the boiler falls below a predetermined low level.

The set of control devices WCD consists of pipes 26, 27, 28 connected at their upper ends to each other and to the steam space of the boiler and connected at their lower ends to the water containing space of the boiler. In the pipe 26 is arranged the magnatrol-float boiler water regulator M—F (indicated at 2′ in Fig. 1 and shown in detail in Fig. 5) controlling the electric switches L1, L2, arranged in the control circuit C, while in the pipe 27 is disposed a water column WC and in the pipe 28 is a cooling jacket CJ and a thermostatic switch LW, a portion of which is enclosed in the cooling jacket. A pipe 29 containing the key needle valve K*n*–2 and leading from the intake end of pipe 23, supplies cooling water to the lower end of the jacket, and a pipe 30 allows flow of the hotter water from the top of the jacket to the delivery end of pipe 23, whereby a circulation of cooling water through the jacket is provided for to keep the thermostat inactive as long as the water in the boiler is above the predetermined low level. When, however, the water in the boiler falls below such level, heat from the steam in pipe 28 will energize the thermostatic element to cause it to open switch LW and stop the operation of the fuel pump.

Figures 5, 7:
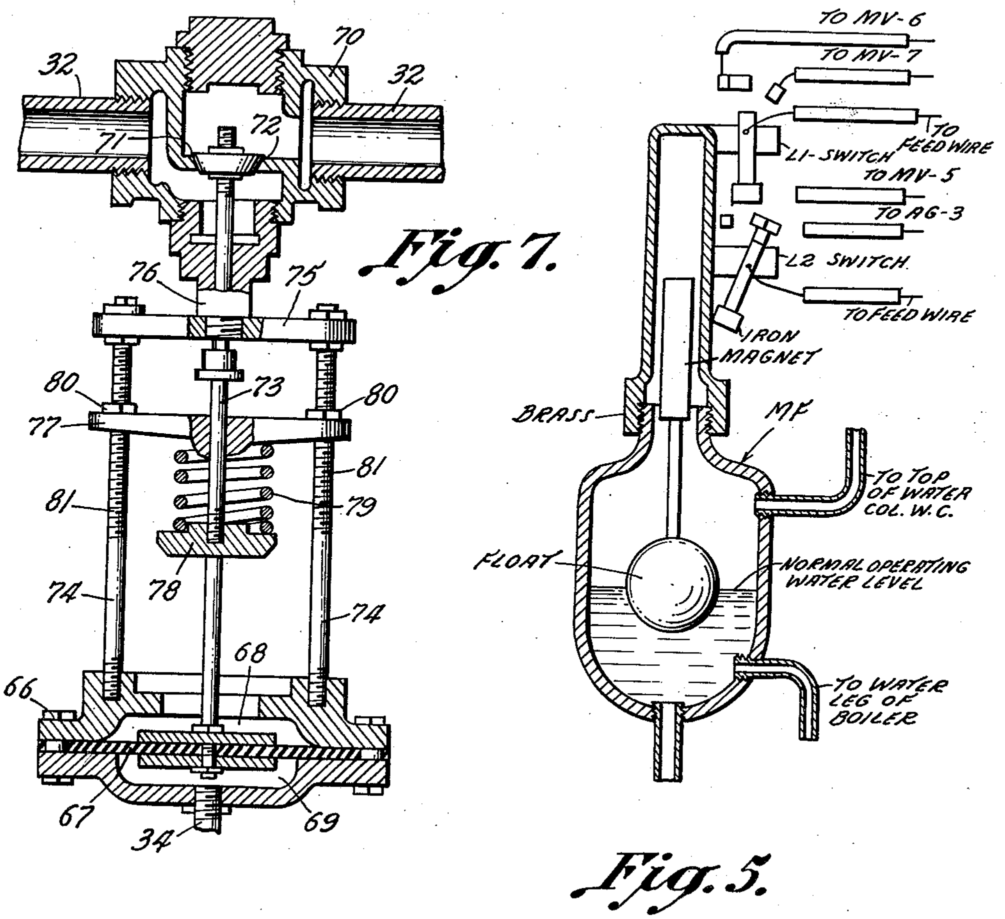
Fig. 5 is a vertical section through the magnatrol float boiler regulator device.
Fig. 7 is a similar view of the water pump regulator.

Leading from the boiler is a main steam supply pipe 31 having a feed branch 32 leading to the water pump WP, a feed branch 33 leading to the turbine $a^2$, a pressure supply branch 34 connecting the branch 33 with the diaphragm chamber of water pressure regulator WPR, as hereinafter described, and a feed branch 35 leading to the atomizing burner B for supplying steam as an atomizing agent thereto. The water pump regulator WPR indicated at 7′ in Fig. 1 and shown in detail in Fig. 7, is of suitable type and arranged in pipe 34 between pipes 32, 33. Spent steam or exhaust pipes 36, 37, leading from the pump WP and turbine $a^2$, are provided for the flow of the exhaust steam therefrom to the jacket of the condenser 24, from which the water of condensation may be conducted through a pipe 38 back to the water supply tank for reuse. The valve 6 in the pipe 31 and the valve 10 in the inlet end of pipe 33 are manually operable control valves. Valve 10, however, which controls the flow of steam to the turbine and is arranged ahead of the turbine regulator TR and pressure regulating valve PR2 in pipe 33, may be automatically controlled to open when the running relay R2 is energized. A drain pipe 35′ governed by the key needle valve K*n*–6 and magnet valve MV7, is included in the steam pipe connections, and drain connections are provided at other points where needed.

The fuel supply connections to the fuel pump and burner consist of a fuel supply pipe 39 leading to the pump $a'$ from a source of fuel supply, an atomizing fuel feed pipe 40 leading from the outlet of the pump to the burner B, a pair of by-pass connections between said pipes across the pump, one of which by-passes contains the high fire key-needle valve K*n*–5 set for supply of fuel to the burner for maximum fire, and the other a pump protecting relief valve RV2, set for 250 lbs., the fuel magnet valve MV1 in the pipe 40, the relief valve RV1 in the pipe 40, and the key-needle low-fire valve K*n*–4 in the pipe 40 which by-passes the valve RV1 and is set to control and allow passage of fuel to the burner for minimum fire. The intake end of pipe 39 is provided with a filter and valves of the character indicated.

The air supplying pipe connections of the system consist of a main air supply pipe 41 leading to the pipe 33 from a suitable source of compressed air supply, such as the main air reservoir of the locomotive, a branch pipe 42 leading therefrom to the pipe 34 below the water pump regulator valve WPR, a branch pipe 43 leading therefrom to the turbine regulator TR, and a branch pipe 44 leading therefrom to the pipe 32, said pipes 41, 42 and 43 containing the magnetic, the manually operable, and the check valves 17, $17^a$ and associated magnet and key-needle valves indicated. The pipe 44, in which the control valve 9 is arranged, connects with pipe 32 between the control valve 8 and the pump WP and may be employed in case of an emergency to supply compressed air to operate said pump WP when the boiler is not generating and the water therein is too low and must be replenished before the system can be started into action. As stated, the pump regulating valve may be of any suitable construction and is arranged so as to be governed by opposing pressures in the pipes 34 and 35′ or 42, to regulate the supply of steam to the water pump.

Figure 3:
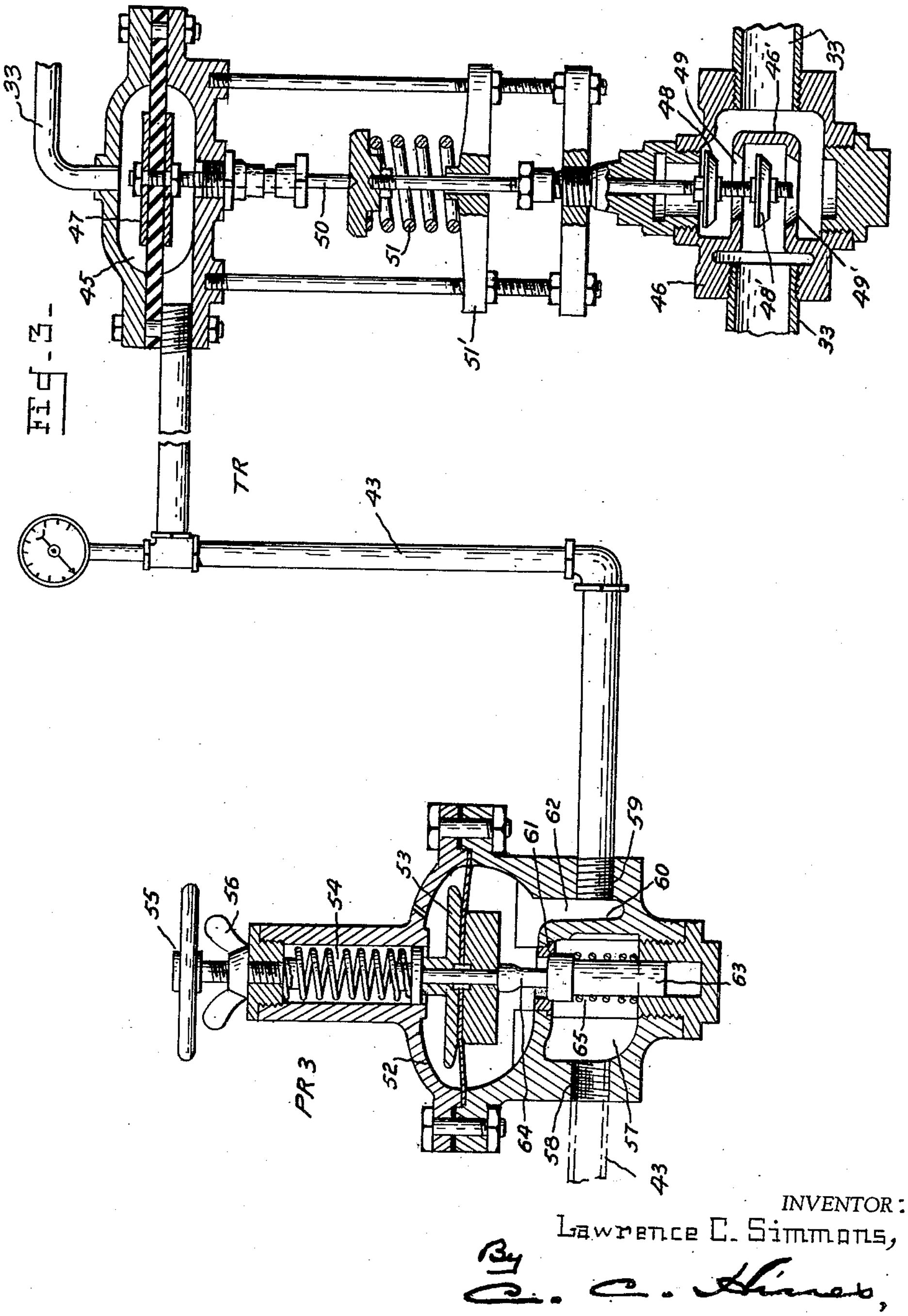
Fig. 3 is a vertical section on an enlarged scale through the turbine regulator and associated control valve.

The turbine regulator TR shown conventionally at 3′ in Fig. 1 and in detail in Fig. 3 includes a diaphragm chamber 45, arranged between portions of the pipes 33 and 43 and a valve chamber 46 arranged in the pipe 33, a diaphragm 47 arranged in the chamber 45 and exposed to the opposing steam and air pressures in the pipes 33 and 43, a valve comprising spaced valve members 48, 48′ in the chamber 46 and controlling the flow of steam to the turbine through upper and lower parts 49, 49′ formed in a partition 46′ in the chamber 46, a stem 50 connecting the diaphragm and valve, and a spring 51 acting on the stem to oppose movement of the diaphragm and valve in the downward direction. Spring 51 is adjustable to regulate its pressure on the diaphragm by means of a supporting and adjusting member 51′. The turbine regulator is adapted for cooperation with the pressure regulating valve PR2 in the by-pass across the valve chamber 46 and the pressure regulating valve PR3 in the pipe 43. These valves PR2 and PR3 may be of any suitable construction, but, as shown, the valve PR3 comprises a casing having a diaphragm chamber 52, a diaphragm 53 in said chamber, a spring 54 in the upper part of the casing exerting downward pressure on the diaphragm, adjusting means 55 for regulating the pressure of the spring, locking means 56 for locking the adjusting means in adjusted position, a valve chamber 57 beneath the diaphragm having inlet and outlet ports 58, 59, a partition 60 separating said ports from each other, a port 61 connecting the inlet port with the bottom of the diaphragm chamber, a port 62 connecting the outlet port with the bottom of the diaphragm chamber, a valve 63 in the valve chamber, a stem 64 connecting said valve with the diaphragm, and a spring 65 pressing upward on the valve to hold it closed or more or less open against the pressure of the spring 54. Valve PR2 may be generally similar in construction to valve PR3. The function of valve PR3 acting in conjunction with the turbine regulator valve TR is to control the turbine action for a desired normal train line pressure, while the function of valve PR2, which is set for 18 lbs., is to control the stand-by action of the turbine. The atomizer pressure regulating valve PR1 is normally set for 15 lbs. pressure.

It will be understood that when the system is in running operation the diaphragm 47 is subjected on its upper side to the pressure of the steam at a desired boiler pressure and on its lower side to the counteracting pressure of the compressed air passed by valve member 63 of valve PR3 plus the pressure of the spring 51. Normally the air in pipe 43 at the inlet side of the valve PR3 is at main reservoir pressure, e. g., 130 lbs. per sq. inch, from which it may be varied by regulation of the spring 54 and position of valve member 63 to deliver the air at any desired pressure below or up to 130 lbs. to the diaphragm chamber 45 to control the movements of the diaphragm 47, and consequently the normal positions and movements of valve members 48, 48′, to regulate the flow of steam to the turbine as a function of boiler pressure to drive the turbine at a desired substantially uniform speed, whereby the amount of fuel supplied to the burner is automatically controlled to cause the boiler to generate steam at the desired maximum pressure. Through the adjustment of valve PR3 the boiler pressure may be changed to any pressure within the limits of the main reservoir air pressure, in this instance, for example, from 250 to 120 lbs. Valve PR2 operates to pass sufficient steam to the turbine to keep the turbine running for standby firing when the turbine regulator valve is closed.

In the air starting operation of the system, assuming that the boiler is cold and in starting condition, and with all even numbered valves, except Nos. 4 and 10 open and all odd numbered valves closed, the starting button is pressed with the result that valves MV1 and MV2 are opened for the flow of air from the air reservoir or supply source to drive unit TPB to supply oil to the burner. Valve 20, which is a reducing valve located in the air line on the turbine side of valve MV2, is preadjusted to allow about 25 lbs. pressure on the turbine when valve MV2 is open to about 130 lbs. main reservoir pressure. The check valve 15 following valve 20 is to protect the air line from condensation flow from the steam line as a safety precaution, although the normal pressures existing in the system could only cause a flow to exist from the air line towards the turbine. The turbine regulator valve TR is normally wide open until the steam pressure in the pipe line is approximately 100 lbs. or more. As this valve and the regulating valve PR2 are not concerned in the air start, except as above described, their working functions at this stage need not be considered. When the fuel supplied to the burner ignites, however, turbine valve 10 is opened. The turbine unit TPB will run on air only to supply fuel and atomizing air to the burner until the boiler pressure is sufficient to lift the check valves in the steam supply pipes, at about 25 lbs. Thereafter, both steam and air will be fed to the turbine and burner until at about 50 lbs. boiler pressure switch PS2 will be opened and cause magnet valve MV2 to close. This cuts off the air supply to the turbine and burner and the steam supply pipes will be supplied with steam to drive the turbine, furnish atomizing steam to the burner and operate the other parts of the apparatus. If the boiler is to be started when the steam pressure is up, the same operation as above described is followed, but in this case when valve 10 is opened the air start magnet valve MV2 will close almost immediately. In the normal air starting operation valve MV2 is energized and opens whenever pressure switch PS2 is closed or start control Agastat AG1 is energized. The interlock on AG1 in MV2 circuit will keep MV2 open for 30 seconds after the start button is pushed, regardless of the boiler pressure and switch PS2 will keep MV2 open until the gas pressure in the pipe line to the burner atomizer reaches a predetermined amount sufficient to keep the turbine running at the desired maximum speed. Whenever switch PS2 is open and AG1 has been deenergized for over 30 seconds MV2 is closed. As soon as the system begins to run entirely on steam generated by the boiler the turbine regulator is governed by boiler pressure to regulate the speed of the unit TPB and the amount of fuel supplied thereby to the burner and the amount of combustion air supplied to the boiler firebox per unit of time to keep the boiler generating at the desired rate.

As before stated, check valve 19$^a$ in pipe 33 between valve 10 and pipe 32, and check valve 19$^b$ in pipe 31 adjacent the boiler, have special functions. Valve 19$^a$, provided with a 1/16 hole in its seat, operates to keep pipe 32 leading to the water pump from being immediately charged with air when valve 10 is opened, which would decrease the pressure in the burner atomizing line and shut down the boiler by opening switch PS1 in the running relay circuit. It also limits the air flow to the water pump in the event that the pump regulator valve is open. This valve automatically closes during the start period, although it may remain open for a few minutes. The check valve 19$^b$ operates to keep the air from charging the boiler. It is also very necessary to keep low pressure, low temperature steam from entering the steam line and condensing in the atomizing line to the burner. The air pressure on top of this check valve holds it closed until the boiler pressure is approximately 25 lbs. Thereafter, there is a steady and increasing flow of steam to the turbine and atomizer. Valves 17, 17$^a$ in pipes 42 and 34, and which are associated, respectively, with the magnet valve MV-5 and key needle valve K*n*-3 and with magnet valve MV-6 and pressure regulator PR-2, also have special functions. Each of these valves is similar in construction to valves 19$^a$, 19$^b$ in being provided with a 1/16 seat hole or meter orifice for cooperation, respectively, with their associated control devices in said pipes. The function of valve 17 is when MV-5 is operated to cooperate with valve K*n*-3 to load chamber 69 of WPR with a charge of air acting on diaphragm 67 to effect the opening of valve 72 against the resistance of the spring 79. The function of valve 17$^a$, which operates when magnet valve MV-6 opens, and pressure regulator PR-3 is set into action, is to load the air chamber below the diaphragm 47 of TR with air acting with spring 51 to resist pressure of the steam on the diaphragm to properly control the opening movement of the valve 48' in response to boiler pressures.

In this system, as stated, the feed of water to the boiler is controlled by controlling the supply of steam to the water pump. By connecting the diaphragm chamber of the pump regulator to the turbine inlet pipe the diaphragm pressure regulates the pump speed with the firing rate and as the firing rate increases the water pump regulator allows more steam to feed to the water feed pump. This is effected by the action of the water pump regulator WPR and associated parts of the system. As stated, the water pump regulator WPR may be of any suitable construction, but I prefer to use one of the type indicated at 7' in Fig. 1 and shown in detail in Fig. 7. This regulator, which is somewhat similar in construction to the turbine regulator TR, is interposed between pipes 32 and 34 and comprises in its construction a diaphragm casing 66 having arranged therein a flexible diaphragm 67 dividing the casing into upper and lower chambers 68 and 69, chamber 68 being open to the atmosphere while chamber 69 is in communication with pipe 34 above the level of pipes 35' and 42. Above the diaphragm casing is a valve casing 70 communicating with portions of the water supply pipe 32 and having a partition provided with a port 71 controlled by a valve 72 carried by a sliding stem 73 which couples the valve to the diaphragm. The stem is slidably mounted in a frame structure connecting the diaphragm and valve casings and consisting of a pair of rods 74 connected at their lower ends to the diaphragm casing and at their upper ends to each other by a head 75 connected by a tubular guide coupling 76 to the valve casing. The stem 73 is slidable through the head 75 and coupling 76 and also through an adjusting member 77 which is slidably mounted on the rods toward and from an abutment 78 on the stem, between which abutment and the member 77 is arranged a supporting and pressure controlling spring 79. The spring normally holds the member 77 pressed upward against adjusting nuts 80 engaging threaded portions 81 of the rods, by which the member 77 may be adjusted to regulate the pressure of the spring and its resistance to the upward movement of the stem and valve under the steam pressure in the diaphragm chamber 69. With this arrangement the regulator WPR controls the supply of steam to the feed water pump WP to govern its action. Normally the valve 72 is held closed and opens according to the steam pressure in the diaphragm chamber 69 supplied thereto from pipe 34 connected to the turbine inlet pipe 33. By connecting the diaphragm chamber to the turbine inlet pipe the diaphragm pressure will be automatically varied according to turbine speed, since the regulator WPR allows more steam to pass to the feed water pump proportionately as the firing rate increases. This method of operation requires the use of controls to definitely limit the water in the boiler within certain levels. This is done through the use of the float MF controlling electric switches L-1 and L-2. With the boiler level normal, between one-half and three-quarters of a glass, switch L-1 energizes MV-6 which opens and connects the pump regulator diaphragm to the turbine inlet pipe. Switch L-2 energizes time delay relay AG-3 which immediately closes the interlock in the running relay R-2 circuit. If the pump regulator adjustment allows the boiler water level to rise, switch L-1 opens the circuit to MV-6, thereby cutting off the supply of steam to the pump regulator diaphragm chamber. It also energizes MV–7 which opens and bleeds off all the pressure from the pump regulator diaphragm chamber. The pump regulator valve is closed when the diaphragm pressure is zero pound. The boiler water level will then start to lower and at about three-quarters of a glass switch L–1 returns to its former position and the feed pump again operates.

If the pump regulator adjustment is such that the boiler water level was lowering from the normal position then switch L–2 would energize magnet valve M–5 and open the circuit to AG–3. Time delay relay switch AG–3 will hold its interlock in the closed position for five minutes after the coil is de-energized. At the end of this five minute period the interlock on AG–3 will open the circuit to the running relay R–2 and shut down the boiler. However, in the five minute interval MV–5 again opens and, through a presetting of Kn–3 against the 1/16 inch hole or diaphragm or meter orifice 17 in the check valve, about 60 lbs. of additional pressure will be placed in the pump regulator diaphragm chamber. This opens the pump regulator valve and speeds up the pump. The water level then returns to normal in about two minutes and switch L–2 will return to its normal position.

From the foregoing description, taken in connection with the drawings, the construction and operation of the system will be understood without a further and extended description, and it will be seen that the invention provides means for driving the turbo-pump-blower unit for a starting action on compressed air until the boiler generates steam at a desired low pressure and for thereafter driving the unit by air and steam and finally by steam alone when the boiler is fully generating, together with novel means governed by steam and air pressures for controlling the speed of the unit to regulate the supply of fuel to the boiler and the rate of steam generation by the boiler, thereby doing away with the use of an electric motor for driving the unit and correspondingly simplifying the construction of the apparatus. Also it will be seen that the invention provides novel means for regulating the action of the water feed pump and controlling the level of the water in the boiler, and pressure controlled electrical means for governing the action of the working parts of the system in a simple, reliable and efficient manner. While the construction disclosed is preferred, it will, of course, be understood that changes in the form, arrangement and details of construction of the parts may be made within the scope of the appended claims without departing from the spirit or sacrificing any of the advantages of the invention.

What is claimed is:

1. In a steam supply system, the combination of a steam boiler, a burner for heating the boiler, fuel supplying means including a pump for supplying fuel to the burner, a motor for driving the pump, a source of compressed air supply, a conductor for conducting air from said source to the motor, a conductor for conducting steam from the boiler to the motor, an electric circuit, means controlling the first named conductor and for energizing said circuit, means operative when the circuit is energized to supply air from the source to drive the motor until the generator generates steam, and means in said circuit and coacting pressure controller means in said second conductor operating when a predetermined boiler pressure is reached to cut off the supply of air to the motor and supply steam thereto.

2. In a steam supply system, the combination of a steam boiler, an atomizing burner for heating the boiler, a pump for supplying fuel to the burner, a turbine for driving the pump, a source of compressed air supply, conductors for respectively conducting air from said source or steam from the boiler to drive the turbine, conductors for respectively supplying air from said source or steam from the boiler to the burner to atomize the fuel, an electric circuit, and pressure controlled means in the conductors and coacting means in the electric circuit operating in starting the system into operation to first supply air from the source to the motor to drive the same and air to the burner to atomize the fuel until the boiler generates steam and then operating when a predetermined boiler pressure is reached to cut off the supply of air to the motor and burner and supply steam thereto to drive the motor and atomize the fuel fed to the burner.

3. In a steam generator, a boiler, an atomizing burner for heating the boiler, a pump for supplying fuel to the burner, a motor for driving the pump, means operative to initially supply air under driving pressure to the motor to operate the pump to feed fuel to the burner, means operative when the boiler generates steam at a low pressure to supply steam with the air supplied to the motor, and means operative when the boiler generates steam at a predetermined higher pressure to cut off the air supply to the motor and to supply steam only to the motor for motor driving actions.

4. In a steam generator, a boiler, an atomizing burner for heating the boiler, a pump for supplying fuel to the burner, a motor for driving the pump, a main steam supply pipe leading from the boiler, steam feed and atomizing pipes connected therewith and with each other and leading respectively to the motor and the burner for supplying steam to drive the motor and steam to atomize the fuel fed to the burner when the boiler is generating, an air supply pipe for supplying air under pressure to said feed and atomizing pipes to initially drive the motor and atomize the fuel when starting the boiler into action and until steam generating begins, means for initiating the air supplying action, and means for cutting off the supply of air and supplying steam only to the feed and atomizing pipes when the boiler generates steam at a predetermined pressure.

5. In a steam generator, a boiler, an atomizing burner for heating the boiler, a pump for supplying fuel to the burner, a motor for driving the pump, a main steam supply pipe leading from the boiler, feed and atomizing pipes connected therewith and with each other and leading respectively to the motor and the burner for supplying steam to drive the motor and steam to atomize the fuel fed to the burner when the boiler is generating, an air supply pipe for supplying air under pressure to said feed and atomizing pipes to initially drive the motor and atomize the fuel when starting the boiler into action and until steam generating begins, an electric circuit, coacting means in said circuit and in the air supply pipe for initiating the air supplying action when the circuit is closed, a normally closed pressure regulating valve in the feed pipe adapted to open at a predetermined boiler pressure to supply steam to the feed and atomizing pipes, and coacting pressure responsive means in the electric circuit and atomizing pipes for cutting off the supply of air thereto and permitting of the supply of steam only to the feed and atomizing pipes when the pressure regulating valve means opens.

6. In a steam generator, a boiler, an atomizing burner for heating the boiler, a pump for supplying fuel to the burner, a motor for driving the pump, a main steam supply pipe leading from the boiler, feed and atomizing pipes connected therewith and with each other and leading respectively to the motor and the burner for supplying steam to drive the motor and steam to atomize the fuel fed to the burner when the boiler is generating, an air supply pipe for supplying air under pressure to said feed and atomizing pipes to initially drive the motor and atomize the fuel when starting the boiler into action and until steam generation begins, an electric circuit, coacting means in said circuit and in the air supply pipe for initiating the air supplying action when the circuit is closed, a normally closed pressure regulating valve in the feed pipe adapted to open at a predetermined boiler pressure to supply steam to the feed and atomizing pipes, means for varying the action of the regulating valve, and coacting pressure responsive means in the electric circuit and atomizing pipes for cutting off the supply of air and permitting of the supply of steam only to the feed and atomizing pipes when the pressure regulating valve opens.

7. In a steam generator, a boiler, an atomizing fuel burner for heating the boiler, an atomizing line leading to the burner, a pump for supplying fuel to the burner, a motor for driving the pump, a steam feed line leading from the boiler to the motor, means for supplying air through the steam feed line and atomizing line to the motor and to initiate a boiler starting action, a valve for opening communication between the boiler, steam feed line and atomizing line when the pressure in the boiler reaches a certain degree, and means responsive to boiler pressure for cutting off the supply of air to the motor and burner and supplying steam only to the motor and burner when the boiler pressure reaches a certain higher degree.

8. In a steam generator, a boiler, a burner for heating the boiler, a pump for supplying fuel to the burner, a motor for driving the pump, means operative to initially supply air under pressure to the motor to feed fuel to the burner, means operative when the boiler generates steam at a low pressure to supply steam with the air supplied to the motor, and means operative when the boiler generates steam at a predetermined higher pressure to cut off the air supply to the motor and to supply steam only to the motor for motor driving actions.

9. In a steam generator, a boiler, a burner for heating the boiler, a pump for supplying fuel to the burner, a motor for driving the pump, a source of air supply, means for supplying air from said source to the motor to drive the pump when starting the boiler into action, means for supplying steam from the boiler to the motor to drive the pump when the boiler is generating, and means responsive to boiler pressure and controlling said air and steam supplying means for automatically cutting off the supply of air to the motor and supplying steam thereto when the boiler pressure reaches a certain degree.

10. In a steam generator, a boiler, a burner for heating the boiler, a pump for supplying fuel to the burner, a motor for driving the pump, a source of air supply, means for supplying air from said source to the motor to drive the pump when starting the boiler into action, means for supplying steam from the boiler to the motor to drive the pump when the boiler is generating, and means responsive to boiler pressure and controlling said air and steam supplying means for automatically cutting off the supply of air to the motor and supplying steam thereto when the boiler pressure reaches a certain degree, and thereafter governing said steam supplying means to regulate the speed of the fuel pump as a function of boiler pressure.

11. In a steam generator, a boiler, an atomizing burner for heating the boiler, a pump for supplying fuel to the boiler, a motor for operating the pump, a source of air supply, conductors for supplying air from said source to the motor to drive the pump and supplying air to the burner for admixture with and atomization of the fuel being fed to the burner when the boiler is started into action, conductors for supplying steam from the boiler to the motor to drive the pump and supplying steam to the burner for admixture with and atomization of the fuel being fed to the burner when the boiler is generating, and means automatically responsive to boiler pressure and controlling the supply of air and steam through said conductors to cut off the supply of driving air to the motor and atomizing air to the burner and to supply driving steam to the motor and atomizing steam to the burner when the boiler pressure reaches a certain degree and thereafter controlling the supply of driving steam to the motor and atomizing steam to the burner as a function of boiler pressure.

12. In a steam generator, a boiler, a burner for heating the boiler, a source of air supply, a rotary shaft, a pump driven by the shaft for supplying fuel to the burner, a motor for operating the shaft to drive said pump, feed conductors for supplying air from said source to the motor to drive the pump and supplying air to the burner for admixture with and atomization of the fuel when starting the boiler into action, feed conductors for supplying steam to the motor to drive the pump and supplying steam to the burner for admixture with and atomization of the fuel when the boiler is generating, and means automatically responsive to boiler pressure and controlling the first named feed conductors for cutting off the supply of air to the motor and burner and controlling the second named feed conductors ot supply steam to the motor and burner when the boiler pressure reaches a certain degree.

13. In a steam supply system, the combination of a steam boiler, a burner for heating the boiler, a rotary shaft, fuel supplying-means including a pump for supplying liquid fuel to the burner, a turbine on the shaft for driving the shaft and pump, a source of compressed air supply, a conductor for conducting air from said source to the turbine, a conductor for conducting steam from the boiler to the turbine, and means controlling said conductors and automatically operating when started into action to supply air from the source to drive the turbine until the generator generates steam and then operating to cut off the supply of air to the turbine and supply steam to said turbine to drive the same.

14. In a steam generator, a boiler, an atomizing liquid fuel burner for heating the boiler, a fuel feed line leading to the burner, a fuel atomizing line leading to the burner, a pump for supplying fuel through the fuel feed line to the burner, a motor for driving the pump, means operative in a starting action for supplying air to the motor to drive the pump and to the atomizing line for flow to the burner and atomization of the fuel, means for supplying steam to the motor and atomizing line when the boiler is generating, and electro-pressure controlled means responsive to boiler pressure for cutting off the supply of air to the motor and atomizing line and supplying steam to the motor and atomizing line when the boiler pressure reaches a certain degree.

15. In a steam supply system, the combination of a steam boiler, a burner for heating the boiler, fuel supplying means including a pump for supplying fuel to the burner, a motor for driving the pump, a source of compressed air supply, conductors for respectively conducting air from said source or steam from the boiler to the motor to drive said motor, an electric circuit, and means in said circuit and coacting pressure controlled means in said conductors automatically operating when started into action to supply air from the source to drive the motor until the generator generates steam and then operating when a predetermined boiler pressure is reached to cut off the supply of air to the motor and supply steam thereto.

16. In a steam generating apparatus, a steam boiler, a burner for heating the boiler, a pump for supplying fuel to the burner, a motor for driving the pump, means for supplying compressed air to operate the pump motor to furnish fuel to the burner in a starting action, means for supplying steam from the boiler to the pump motor to furnish fuel to the burner when the boiler is generating, means automatically controlling said air and steam supplying means for cutting off the supply of air to the pump motor and supplying steam from the boiler to operate the pump motor to furnish fuel to the burner as soon as the boiler generates steam at a predetermined pressure.

17. In a steam supply system, the combination of a steam boiler, a burner for heating the boiler, a pump for supplying fuel to the burner, a motor for driving the pump, a source of compressed air supply, conductors for conducting air from said source or steam from the boiler to drive the motor, an electric circuit, and coacting pressure controlled means in the conductors and electric circuit controlled by and controlling said pressure controlled means and operating in starting the system into operation to first supply air from the source to the motor to drive the pump until the boiler generates steam, and then operating when a predetermined boiler pressure is reached to cut off the supply of air to the motor and supply steam thereto.

18. In a steam supply system, the combination of a steam boiler, an atomizing burner for heating the boiler, a pump for supplying fuel to the burner, a motor for driving the pump, a source of compressed air supply, conducting connections for conducting air from said source to the motor to drive the pump and to the burner to atomize the fuel, conducting connections for conducting steam from the boiler to the motor to drive the pump and to the burner to atomize the fuel, an electric circuit, and pressure controlled means in the conducting connections and coacting means in the electric circuit controlled by and controlling said pressure controlled means and operating in starting the system into operation to first supply air from the source to the motor to drive the same and to the burner to atomize the fuel until the boiler generates steam and then operating when a predetermined boiler pressure is reached to cut off the supply of air to the motor and burner and supply steam thereto to drive the motor and atomize the fuel.

19. In a steam generator, a boiler, a burner for heating the boiler, a pump for supplying fuel to the burner, a motor for driving the pump, a conductor for supplying compressed air from a source of supply to the motor, a conductor for supplying steam from the boiler to the motor, means dependent upon the boiler pressure to cut off the supply of compressed air from the first named conductor to the motor and supply steam through the second named conductor to the motor at a predetermined steam pressure and thereafter regulate the supply of steam thereto as a function of boiler pressure, pressure controlled means independent of the aforesaid means for controlling the supply of fuel to the burner, and pressure controlled means for stopping the motor in the event of burner failure.

References Cited in the file of this patent

UNITED STATES PATENTS

| | | |
|---|---|---|
| 666,862 | Emerick | Jan. 29, 1901 |
| 1,049,580 | Hatch | Jan. 7, 1913 |
| 1,442,876 | Hartman | Jan. 23, 1923 |
| 1,632,401 | Grahame | June 14, 1927 |
| 1,948,537 | Noack | Feb. 27, 1934 |
| 1,991,114 | Noack | Feb. 12, 1935 |
| 2,106,414 | Price | Jan. 25, 1938 |
| 2,116,943 | Hamilton et al. | May 10, 1938 |